United States Patent [19]
Llewellyn et al.

[11] Patent Number: 5,640,481
[45] Date of Patent: Jun. 17, 1997

[54] GUIDING OPTICAL FIBRES

[75] Inventors: Laurence Llewellyn, Chepstow; Mark George Graveston, Newport; Simon Charles Tristan Benton, Felixstowe; Ispran Sharma Kandasamy, Newport; Peter George Hale, Bristol; Peter David Jenkins, Woodbridge; Stephen John Hough, Symonds Yat, all of United Kingdom

[73] Assignee: Pirelli General plc, London, England

[21] Appl. No.: 512,189

[22] Filed: Aug. 7, 1995

[30] Foreign Application Priority Data

Aug. 15, 1994 [GB] United Kingdom ............... 9416462

[51] Int. Cl.⁶ ............................................... G02B 6/00
[52] U.S. Cl. ............................................ 385/134; 385/147
[58] Field of Search ......................................... 385/134, 135, 385/136, 137, 147

[56] References Cited

U.S. PATENT DOCUMENTS 5,475,585  12/1995  Bush ............................... 364/401

FOREIGN PATENT DOCUMENTS

| 0271213A2 | 11/1987 | European Pat. Off. | G02B 6/44 |
| 02711213 | 11/1987 | European Pat. Off. | 385/134 |
| 0368445A3 | 5/1990 | European Pat. Off. | G02B 6/44 |
| 0500327a1 | 7/1993 | European Pat. Off. | H02B 1/20 |
| 3704560A1 | 8/1988 | Germany | H04B 1/00 |
| 4029857 | 3/1992 | Germany | H02G 15/18 |
| 4229510A1 | 3/1994 | Germany | G02B 6/36 |
| WO91/10927 | 1/1991 | WIPO | G02B 6/00 |

*Primary Examiner*—Akm E. Ullah
*Attorney, Agent, or Firm*—Brooks Haidt Haffner & Delahunty

[57] ABSTRACT

A system for guiding optical fibres comprises a device which includes a plurality of units, each of which defines a row of ducts extending from a first end of the unit to a second end thereof for guiding optical fibres. The units are arranged successively in overlapping relationship with their first ends in substantial alignment at an end portion of the device and their second ends being spaced apart at successively increasing distances from the device end portion.

14 Claims, 4 Drawing Sheets

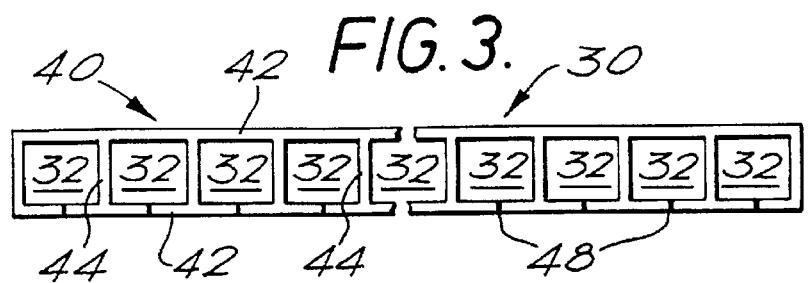
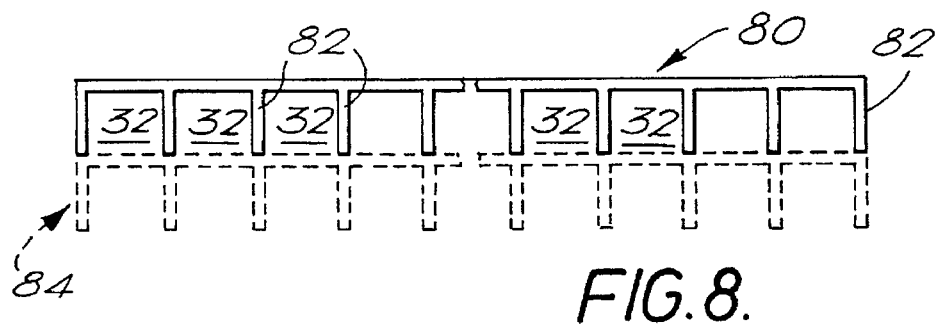
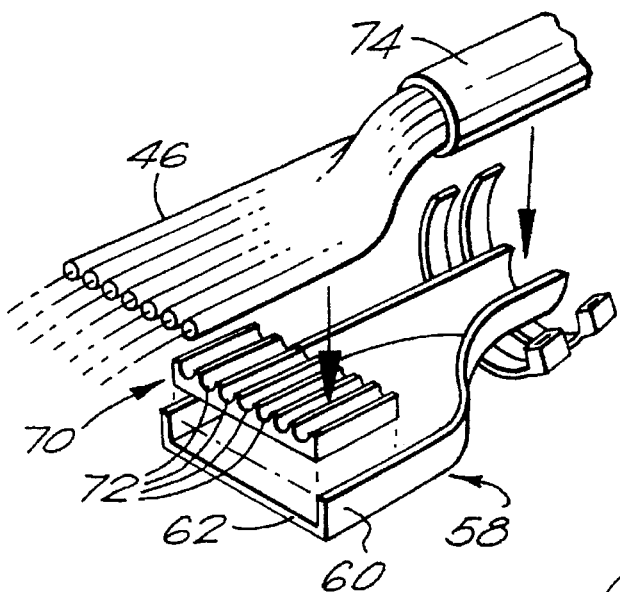
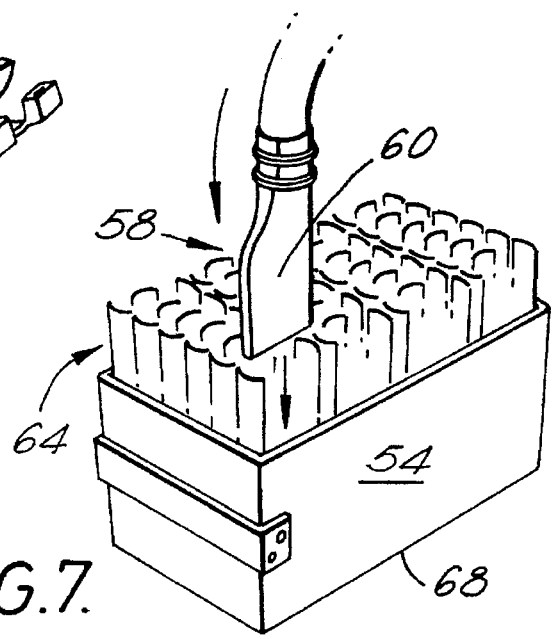

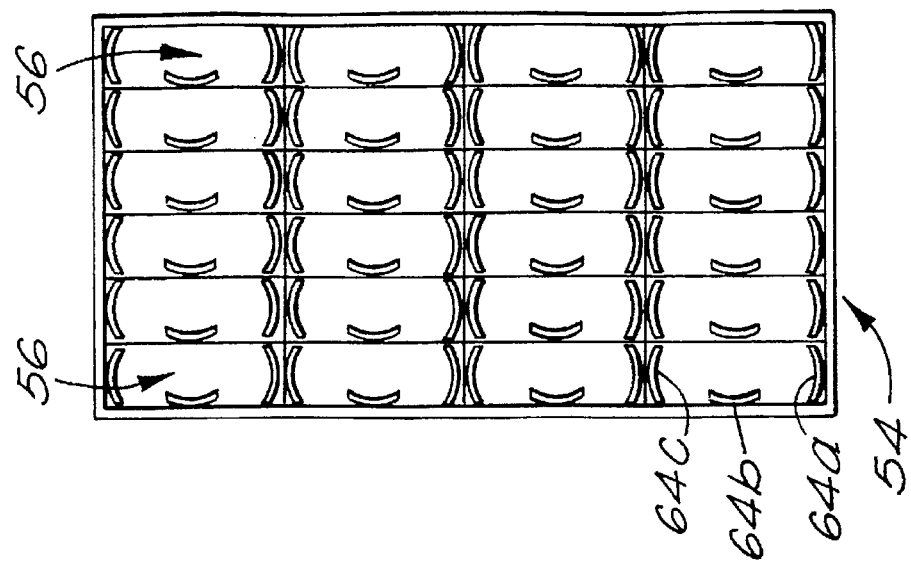
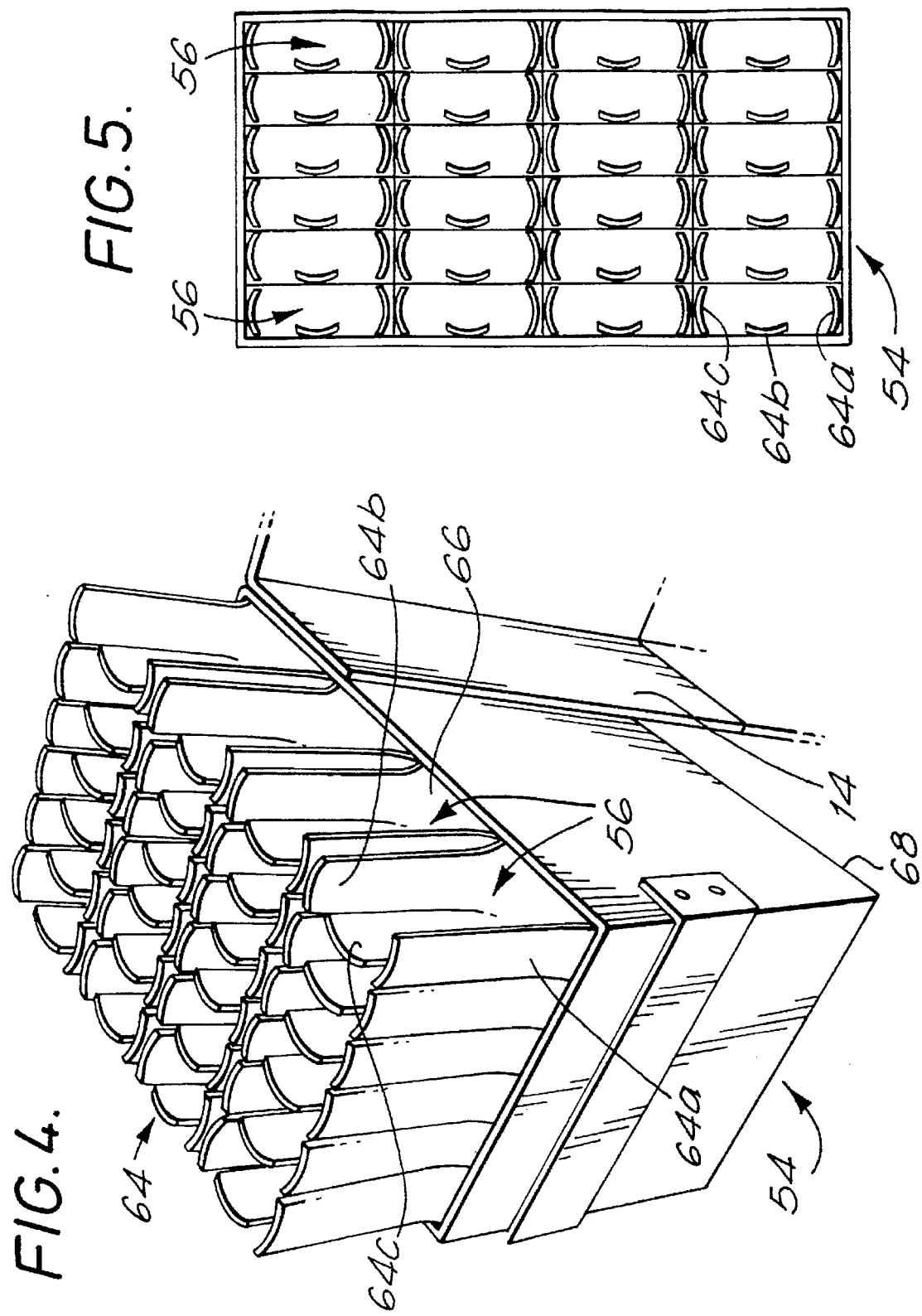

GUIDING OPTICAL FIBRES

This invention relates to guiding optical fibres.

The invention is particularly, but not exclusively, concerned with guiding optical fibres which run to one or each side of a bank of vertically aligned apparatus in which interconnections between the optical fibres are housed, thus, requiring each optical fibre to be directed to a specific apparatus in the bank.

An object of the invention is to enable such optical fibres to be run in an ordered way.

The invention accordingly provides a system for guiding optical fibres comprising a device comprising a plurality of units, each of which defines a plurality of ducts extending from a first end thereof to a second end thereof for guiding optical fibres, said units being arranged successively in overlapping relationship with their first ends forming an end portion of the device and their second ends being spaced apart at successively increasing distances from said end portion.

The above-mentioned units are preferably integral or fixedly interconnected but in certain applications it may be beneficial for the units to be pivotally interconnected at said end portion whereby each unit is pivotal relative to the other units.

The ducts may be arranged in rows in the units and to this end each unit may comprise a sheet having parallel spaced apart walls with connecting partitions extending transversely thereto to define therewith said ducts. In the two embodiments described hereinafter each unit comprises a twin-wall sheet of plastics material with partitions extending transversely between the two walls of the sheet to define a single row of ducts. At least some of the units may have slits extending between the first and second ends thereof for providing access to at least some of their ducts.

As an alternative each unit may comprise a plate having parallel spaced apart fins extending between said ends of the unit for defining said ducts.

Although not essential, preferably the first ends of the units are substantially aligned.

The system may comprise an alignment means provided with a plurality of through-passages arranged for alignment with said ducts at said end portion of said device.

The ducts of the device and thus the through-passages of the alignment means may with advantage be arranged in a matrix, and in such a case the system advantageously also comprises at least one means for arranging elongate elements of a cable in a row for insertion into respective through-passages of said alignment means, said arranging means being connectable with said alignment means via a male and female connection means.

In order that the invention may be well understood, the two embodiments referred to above, which are given by way of example only, will now be described in more detail with reference to the accompanying drawings, in which:

FIG. 3 is a fragmentary cross-section of one of the units of the system of FIG. 1 or FIG. 2;

FIG. 4 is perspective view of an alignment device of the system shown in FIG. 2;

FIG. 5 is a top plan view of the alignment device of FIG. 4;

Figure 1:
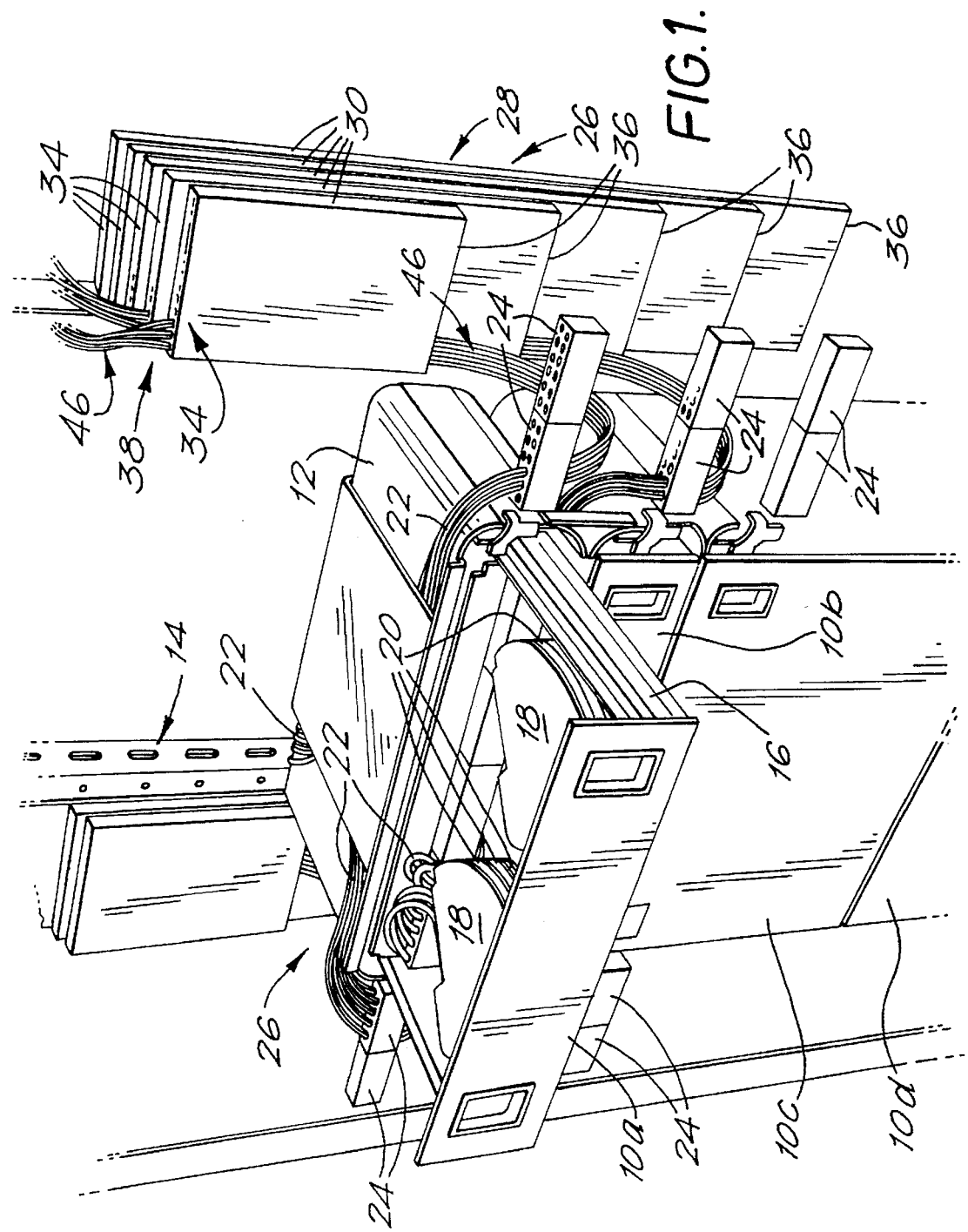
FIGS. 1 and 2 show respective perspective schematic views of parts of different equipment, each comprising a bank of vertically aligned apparatus for housing optical fibre interconnections and a system embodying the invention to each respective side of the bank for guiding optical fibres to the apparatus.
Figure 2:
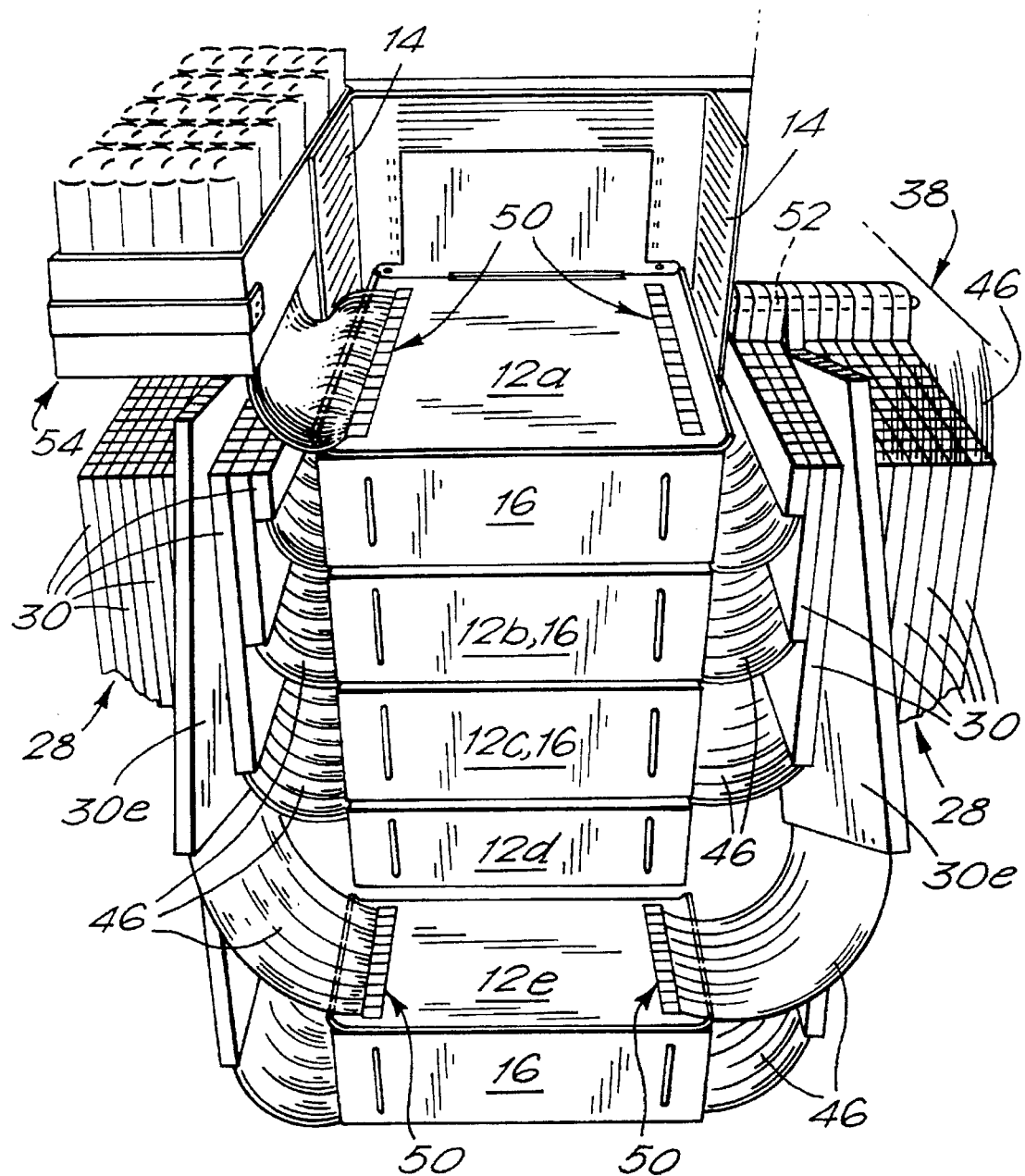

FIG. 6 an exploded view of a connector for use with the alignment device;

FIG. 7 schematically illustrates connection of the connector with the alignment device; and FIG. 8 is a fragmentary cross-section of an alternative unit of the system of FIG. 1 or FIG. 2 shown cooperating with a like unit.

Referring first to FIG. 1, the illustrated equipment comprises a bank of vertically aligned apparatus 10, some of which are illustrated and designated 10a, b, c and d, for locating optical fibre interconnections. Each apparatus 10 comprises a support 12 which is fixed to a rack 14 (the left hand element only of which is illustrated in FIG. 1 for clarity) and slidably supports a shelf or drawer 16 for movement between a retracted position and an extended position to provide access to banks 18 of housings 20 supported thereon, which housings locate optical fibre connections. Apparatus 10b, c and d are shown with their shelves in their retracted positions and apparatus 10a is shown with its shelf in its extended position. Guide means, generally referenced 22, in the form of interconnected tubes define passages from respective connector blocks 24 to each side of each apparatus 10 to the housings 20 thereof for guiding optical fibres to the housings. In the equipment illustrated in FIG. 1, the connector blocks are mounted to the fixed support 12 and provide an array of connectors which extend in a direction transverse to the direction of sliding of the shelf or drawer 16.

A system generally indicated at 26 is provided for guiding optical fibres on each side of the bank of apparatus 10 to the connector blocks 24 associated with each apparatus 10a, b, c and d.

Further details of the construction and arrangement of the apparatus 10 and the guide means 22 are not required for understanding the construction and working of the systems 10, so are not given herein. However, attention is directed to the disclosure in co-pending application No. 9412368.4 for a fuller disclosure of the apparatus 10 and guide means 22 of this embodiment and the equivalent parts of the embodiment illustrated in FIG. 2 described hereinafter.

As best seen on the right hand side of FIG. 1, the system 26 comprises a device 28 which itself comprises a plurality of units 30. Each unit 30 defines a plurality of ducts 32 as more clearly indicated in FIG. 3. These ducts 32 extend from a first end 34 of each unit to a second end 36 thereof for guiding optical fibres between those ends. The units 30 have different lengths and are arranged successively in overlapping relationship with their first ends 34 forming an end portion 38 of the device 28 and their second ends 36 being spaced apart at successively increasing distances from this end portion 38, such that each unit 30 has its second end 36 located so as to be associated with the connector blocks 24 associated with a respective apparatus 10.

The units 30 in the embodiment are separate units which are fixedly interconnected. However, it is to be understood that the units may be integral so that the device 28 is a one-piece structure.

The ducts 32 are arranged in rows in the units 30 of the device 28 and in the embodiment, as better shown in FIG. 3 each unit comprises a sheet 40 having parallel spaced apart walls 42 with connecting portions 44 extending transversely thereto to define therewith the ducts 32. More specifically, in the embodiment, each unit comprises a twin-wall sheet of plastics material having the above construction and providing a single row of ducts.

The first ends 34 of the units 30 may be staggered at the end portion 38 of the device as illustrated in FIG. 1 or alternatively they may be substantially aligned thereat.

As will be apparent from FIG. 1 the device 28 enables optical fibres to be run to one side of the bank of apparatus 10 in an ordered way. By way of example, in FIG. 1, tubes 46 containing optical fibre units are illustrated being guided from a duct (not shown) above the equipment to the connector blocks 24 where they are interconnected with tubes 22. The optical fibre units, which typically comprises four optical fibres are installed in the tubes 46 by the blown fibre technique, disclosed for example in EP-A-0108590, and may be guided to desired housings from the connector blocks 24 by being blown through tubes 22. Alternatively, the optical fibres may be single optical fibres provided with loose or tight jackets. In this case the optical fibres are passed through tubing during their paths from the location at which they are broken out from the optical fibre cable to the connector blocks 24. In this connection, it is not essential, but may be convenient, for this tubing to extend through the ducts 32 of the units 30.

The units 30 have slits 48 (see FIG. 3) extending between their first and second ends for providing access to the ducts. These slits, when accessible enable optical fibre elements, i.e. blown fibres in tubes or fibres in loose or tight jackets to be inserted into the duct sideways using a tool which is drawn along the slit plough-like, when it is not possible or desirable for the fibre element to be inserted into the duct from one end thereof.

Referring now to FIG. 2, the equipment shown therein corresponds generally to the equipment shown in FIG. 1 and the like or corresponding components have been given like references and will not be described in detail to avoid unnecessary repetition.

The equipment illustrated in FIG. 2 differs from the equipment illustrated in FIG. 1 in that in FIG. 1 the connector arrays extend to each side of the bank of apparatus in a direction transverse the direction of sliding of the shelves 16 and are mounted to the fixed support 12 whereas in FIG. 2 the equivalent connector arrays, referenced 50, are mounted on the supports which slidably support the shelves or drawers 16 and extend substantially in the direction of sliding movement. In view of this arrangement, the support 12 for each shelf is not fixed to the rack but is itself slidably supported on brackets fixed to the rack for movement between a retracted position and extended position to provide access to the connector arrays 50. In FIG. 2, supports 12a–d are shown in their retracted positions and shelf 12e is shown in its extended position.

In order to accommodate the sliding movement of the supports 12, the units 30 of the device 28 are pivotally interconnected at the end portion 38 thereof such that each unit 30 is able to pivot relative to the other units when the support 12 with which the unit is associated is slid. Thus unit 30e is shown pivoted out of alignment with the other units of each device 28 in FIG. 2. As illustrated, the units are pivotally mounted on a pivot pin 52.

Also illustrated in FIG. 2, in association with the left-hand device 28 is an alignment device 54. The right hand device 28 is also provided with an alignment device but this is omitted in the Figure for clarity.

As better shown in FIGS. 4 and 5 the device 54 which is fixed to the rack 14 is provided with through-passages 56 which are arranged for alignment with the ends of the ducts 32 at the end portion 38 of the device 28. Thus in the embodiment, the through passages are arranged in a matrix. It will be appreciated that the alignment device is particularly desirable in the embodiment shown in FIG. 2 for re-routeing the optical fibres in an ordered way to the ducts 32 since the units 30 are pivotable relative to each other.

However, it is to be understood that the alignment device may also be used with the device 28 of FIG. 1, particularly when the optical fibres comprise blown optical fibre units in tubes 46 as the device also provides a convenient way of arranging the tubes 46 for insertion in the ducts 32 of the device 28.

The illustrated alignment device 54 is adapted to be used with a plurality of devices 58, one of which is shown in FIG. 6. Each device 58 has a housing 60 defining an elongate opening 62 through which the tubes 46 arranged in a row extend.

The devices 58 are connectable to the device 54 via male and female connections. Specifically, the devices 58 are inserted in the through-passages 56, and in the embodiment two such devices are inserted into each through-passage. Resilient projections 64 extend from the face 66 of the alignment device 54 opposite the face 68 opposed to the end portion 38 of the device 28 and as will be clear from the drawings and especially FIG. 7 respective groups of projections each comprising two opposed end projections 64a, b and one side projection 64c are associated with each through-passage 56. After two devices have been inserted into a through-passage 56 they are tied to the projections associated therewith to provide firm location.

With further reference to FIG. 6 it will be noted that each device 58 comprises a member 70 having parallel spaced apart channels 72 for locating the tubes 46 which are laid up in a core in an optical fibre cable 74 in a row prior to their exit from the device 58 through opening 62.

As will be apparent, in this way optical fibres from a cable can be routed via a device 58 and the alignment device 54 to a unit 30 for passage to the housings associated with that unit. Alternatively if the device 54 illustrated is rotated through 90°, the optical fibres from a cable can be routed via a device 58 and the device 54 to different units 30 for passage to the housings associated with those units. For the sake of clarity, whilst the tubes 46 are illustrated extending between the second ends of the units 30 and the connector arrays 50 associated therewith in FIG. 2, the tubes 46 extending between the device 54 and the first ends of the units 30 of the left hand device 28 are not shown, nor are they shown extending from the first ends of the units of the right-hand device 28. Also the tubes 46 have been omitted from FIG. 7.

When the optical fibres in the cable 74 are not themselves provided in tubes, the member 70 may locate the ends of tubes for such fibres which tubes pass through the through passages of the alignment device 54 to the device 28.

As an alternative to the sheet 40 shown in FIG. 3 each unit 30 of the device 28 in either FIG. 1 or FIG. 2 comprises, as shown in FIG. 8, a plate 80 having parallel spaced apart fins 82 extending between the ends of the unit for defining the ducts which have again been reference 32 and which are open-sided. The fins are located on one side only of the plate in the illustrated arrangement and when a plurality of plates are assembled together to form a device 28, with the exception of one outside plate, the ducts defined by each plate are closed along their open sides by an adjacent plate. This is illustrated in FIG. 8 when the plate 80 is shown cooperating with a like plate 84 which has been illustrated in dotted-line. The outside plate whose ducts are not so closed may be closed with an additional un-finned plate (not illustrated. It will be appreciated that this alternative arrangement is particularly applicable to the device 28 of FIG. 1 since in that device the units 30 are fixedly interconnected. It will be appreciated that the plates may advantageously be orientated such that the plates which close the open sides of the ducts of their adjacent plates are longer than their adjacent plates so that the ducts are closed along all of their length, rather than part of their length, although the latter is possible.

The plates may be metal to provide fire resistance and the finned plates may be extrusions. In this connection it is presently envisaged that the finned plates are aluminium extrusions.

It will be appreciated that in both of the above-described embodiments, the systems 26 to each side of the banks of apparatus enable optical fibres to be run in an ordered way to selected apparatus.

We claim:

1. Optical fibre guiding apparatus for guiding optical fibres to equipment to which the fibres are to be connected, said guiding apparatus comprising:

a plurality of contiguous units, each unit having a first end and a second end and having walls defining at least one duct extending from said first end to said second end for receiving and guiding optical fibres from said first end to said second end, said units being arranged with the first ends forming an end portion of said guiding apparatus and said units having different lengths between their first ends and their second ends so that their second ends are spaced apart at successively increasing distances from said end portion.

2. A system as claimed in claim 1, wherein said units are pivotally interconnected at said end portion whereby each unit is pivotal relative to the other units.

3. Apparatus as set forth in claim 1 wherein each of units has a plurality of said ducts therein which are arranged in generally parallel rows.

4. A system as claimed in claim 3, wherein each unit comprises a sheet having parallel spaced apart walls with connecting partitions extending transversely thereto to define therewith said ducts.

5. A system as claimed in claim 4, wherein each unit comprises a twin-wall sheet of plastics material.

6. A system as claimed in claim 3, wherein each unit comprises a plate having parallel spaced apart fins extending between said ends of the unit for defining said ducts.

7. A system as claimed in claim 1, wherein at least some of the units have slits in a wall of at least some of the ducts extending between the first and second ends thereof for providing access to at least some of the ducts.

8. A system as claimed in claim 1, wherein said first ends of said units are substantially aligned.

9. A system as claimed in claim 1, comprising an alignment means provided with a plurality of through-passages arranged for alignment with said ducts at said end portion of said device.

10. A system as claimed in claim 9, wherein said through-passages are arranged in a matrix.

11. A system as claimed in claim 10, comprising at least one means for arranging elongate elements of a cable in a row for insertion into respective through-passages of said alignment means, said arranging means being connectable with said alignment means via a male and female connection means.

12. Apparatus as set forth in claim 1 wherein said units are part of an integral unit.

13. Apparatus as set forth in claim 14 wherein said units are secured to each other in fixed relationship.

14. In apparatus comprising a bank of aligned housings for housing optical fiber interconnections, optical fibre guiding apparatus located at at least one side of the bank of aligned housings for guiding optical fibres to said housings, said guiding apparatus comprising:

a plurality of contiguous units, each unit having a first end and a second end and having walls defining at least one duct extending from said first end to said second end for receiving and guiding optical fibres from said first end to said second end, said units being arranged with their first ends forming an end portion of said guiding apparatus and said units having different lengths between their first ends and their second ends so that their second ends are spaced apart at successively increasing distances from said end portion.

* * * * *